Jan. 9, 1968  H. E. McCORMICK  3,362,719
INSERTS FOR ROTARY SHAFT SEALS
Filed Oct. 23, 1965

INVENTOR.
HAROLD E. McCORMICK
BY *Hill, Sherman, Meroni, Gross & Simpson* ATTORNEYS

United States Patent Office 3,362,719
Patented Jan. 9, 1968

3,362,719
INSERTS FOR ROTARY SHAFT SEALS
Harold E. McCormick, Ballwin, Mo., assignor to Ramsey Corporation, St. Louis, Mo., a corporation of Ohio
Filed Oct. 23, 1965, Ser. No. 503,130
12 Claims. (Cl. 277—37)

The present invention relates to rotary shaft seals, particularly those composed of fluorocarbon polymers such as tetrafluoroethylene resins.

Shaft seals of the conventional type are normally limited in the fluid pressure which can be applied to the sealing side of the seal. Pressures in excess of small values may cause seals of the conventional type to deform or distort. When this happens, the sealing edge is no longer in contact with the shaft uniformly with a well defined sealing land. Consequently, the seal will not then retain oil and will permit passage of oil along the shaft.

Another problem particularly troublesome in the design of rotary shaft seals made of molded fluorocarbons is the provision of a dust shield to prevent access of dirt to the sealing edge of the sealing element. In the case of seals made with elastomers, this problem is frequently solved by molding an integral lip into the sealing element, the lip riding in close proximity to the shaft and serving as an effective dirt barrier. However, due to the flow characteristics of fluorocarbon materials, and the types of molds employed for molding them, it is not feasible to mold an integral lip onto such sealing elements. Consequently, an excessive amount of dust may contact the sealing lip, causing the same to be worn or abraded away, and may ultimately lead to failure of the seal.

Rotary shaft oil seals are normally made in standard sizes. Consequently, a particular seal may be used in a low pressure application, with no dirt problems presented, and in the next installation, the same size seal may be used in a high pressure application and where dirt is a considerable problem. From a tooling, production, and economic standpoint, it is desirable to have one basic seal design which can be used in both types of applications. The present invention solves this problem by providing a readily engageable insert for fluorocarbon type seals which can be easily engaged with the basic seal structure where the seal is to be used in an environment of high pressure and/or an environment of dirt to provide additional support for the sealing element, and to minimize the exposure of the sealing lip to dirt.

One of the objects of the present invention is to provide an improved insert for a fluorocarbon type seal which can be readily engaged with the remainder of the seal assembly to provide additional support for the seal in high pressure use.

Another object of the invention is to provide an insert for a fluorocarbon type seal having a lip portion thereon protecting the sealing land of the seal element from contamination with dirt.

Another object of the invention is to provide an inexpensive insert for a fluorocarbon type seal which can be used with standard seal designs when necessary without substantially increasing the cost of the sealing assembly.

In a typical shaft seal assembly employing a fluorocarbon resin, the sealing element has a sealing lip arranged to engage a shaft in sealing relation, and an annular flange portion bonded to the inner surface of a base wall of a centrally apertured metallic case. The geometry of such sealing elements usually provides a relatively flexible web portion extending between its sealing lip and the annular flange portion which is secured to the case. In accordance with the present invention, I provide an insert which is detachably securable to the seal assembly, and having a web portion arranged to underlie the web portion of the sealing element and thereby reduce distortion of the web portion under conditions of high fluid pressure, and an annular flange portion arranged to be received in close fitting engagement against the outer surface of the base. The insert is further provided with a lip proportioned to extend in closely spaced relation to the shaft and thereby prevent dirt from approaching the area of the sealing lip.

A further description of the present invention will be made in conjunction with the attached sheet of drawings which illustrates several preferred embodiments.

Figure 1:
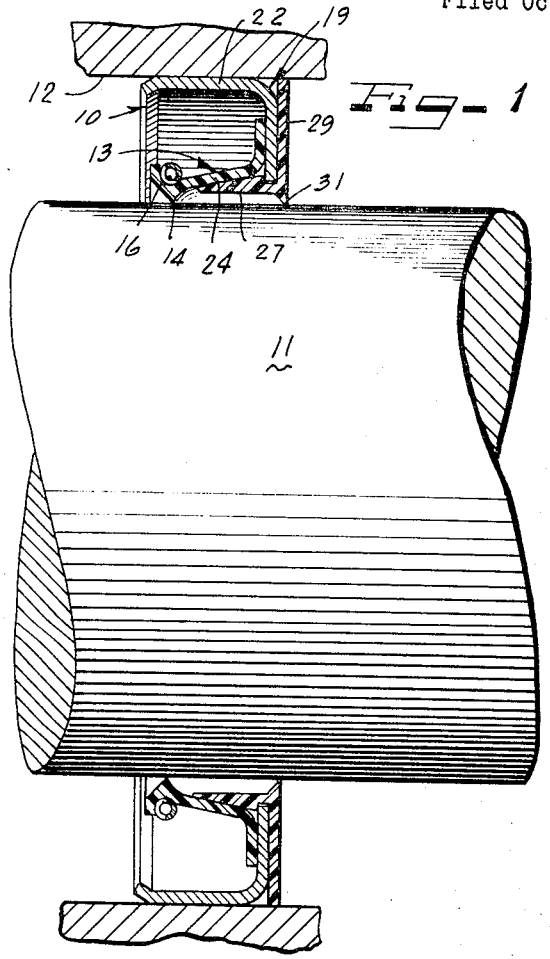
FIGURE 1 is a view partly in elevation and partly in cross-section of a shaft seal assembly according to the present invention.

In FIGURE 1, reference numeral 10 indicates generally a shaft seal assembly embodying the improvements of the present invention and arranged to engage a shaft 11 in sealing engagement therewith. The shaft seal assembly 10 is tightly received within a bore 12 formed in the shaft support structure.

Figure 2:
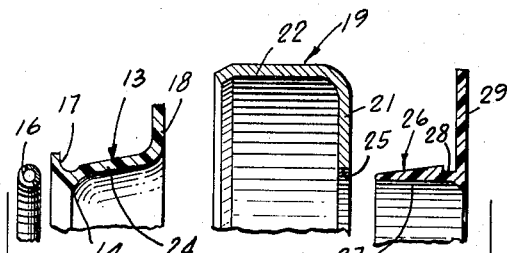
FIGURE 2 is a fragmentary exploded view of the shaft seal assembly shown in FIGURE 1.

The sealing element itself, indicated at reference numeral 13 in the drawings is composed of a fluorocarbon resin such as a tetrafluoroethylene resin ("Teflon") which may include a filler such as glass fibers. The sealing element 13 is molded into a configuration which includes a relatively narrow or knife-edge sealing land 14 arranged to engage the shaft 11 and provide a barrier for fluid flow along the shaft. The natural resilience of the seal element 13 and the compressive action of a garter spring 16 disposed in a socket 17 of the sealing element (FIGURE 2) provide the requisite pressure for holding the sealing land 14 against the shaft.

The other extremity of the sealing element 13 includes a radially extending annular flange portion 18 which is sealed by an adhesive or other suitable means to a cup-shaped case 19. The latter has a base wall 21 and an axially extending cylindrical wall 22, the base wall 21 being provided with a centrally disposed aperture 25 having a diameter greater than the diameter of the shaft 11.

Intermediate the socket 17 and the annular flange portion 18, the sealing element 13 has a web portion 24. Under conditions of high fluid pressure, the web portion 24, if unsupported, may be distorted so that it is bowed into engagement with the periphery of the shaft 11. This flexure of the sealing element is likely to prevent uniform contact of the sealing land 14 with the periphery of the shaft 11. To overcome this difficulty, the present invention provides a readily engageable insert 26 which cooperates with the sealing element 13 and the case 19 to provide additional support for the web portion 24. Specifically, the insert 26 has a web portion 27 arranged to underlie the web portion 14 of the sealing element and thereby provide additional support for the web portion under conditions of high fluid pressure. The insert 26 has a peripheral groove 28 which is arranged to tightly engage the aperture defining edge of the base wall 21 as best illustrated in FIGURE 1 of the drawings. The insert 26 also has an annular flange portion 29 which is arranged to be received against the outer wall of the base 21 of case 19. Depending from the annular flange portion 29 is a lip 31 which is proportioned to extend in closely spaced relation to the periphery of the shaft 11 and serve as a dust barrier, thereby protecting the sealing land 14 against abrasion by foreign particles. Thus, the insert 26 can be rapidly combined with the other elements of the shaft seal simply by inserting the flange portion 27 through the aperture in the case 19, so that the flange portion 27 provides a relatively rigid support for the web portion 24 when the aperture defining edge of the base wall 21 is snugly received in the groove 28.

The insert 26 is preferably made of a thermoplastic resinous material which may be of a resin such as "Delrin" (an acetal resin derived from the polymerization of formaldehyde), "Celcon" (an acetal copolymer based on trioxane) or nylon. For the purposes of the present invention, the material used for the insert 26 should have a minimum tensile strength of 3000 p.s.i. when exposed to a temperature of 180° F.

Figure 3:
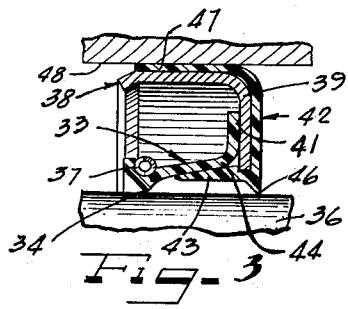
FIGURE 3 is a fragmentary cross-sectional view of a modified form of seal assembly according to the present invention.

The insert can also be designed to provide an improved seal at the joint between the seal case and the bore in which the seal is inserted. This type of configuration is shown in FIGURE 3 of the drawings. The structure illustrated in that figure includes a sealing element 33 having a sealing land 34 engaging the periphery of a shaft 36. A garter spring 37 seated in a socket provided in the sealing element 33 helps to urge the sealing land 34 against the periphery of the shaft. A case 38 has an apertured base 39 against which an annular flange portion 41 of the sealing element 33 is bonded.

An insert 42 composed of a thermoplastic material or the like has an inwardly extending flange portion 43 providing support for a web portion 44 of the sealing element, and also has a lip 46 serving as a dirt barrier to protect the sealing land 34. The insert, in addition, has an axially extending cylindrical wall portion 47 arranged to be snugly received about the outer periphery of the case 38, between the case and the wall 48 of the support in which the seal assembly is inserted.

Figure 4:
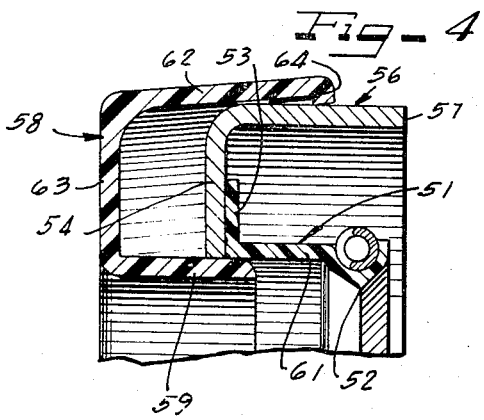
FIGURE 4 is a fragmentary cross-sectional view of still another form of seal assembly showing the manner in which the insert is arranged to be received upon the remainder of the seal assembly.
Figure 5:
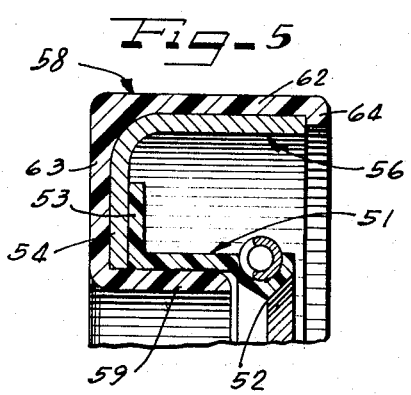
FIGURE 5 is a fragmentary cross-sectional view of the seal assembly of FIGURE 4 in its completely engaged position.

A snap-over type of insert structure is illustrated in FIGURES 4 and 5 of the drawings. In these two figures, there is provided a sealing element 51 having a sealing land 52 and an annular flange portion 53 bonded to a base wall 54 of a case 56 having a rim 57. An insert 58 composed of a thermoplastic material or the like has an inner cylindrical wall portion 59 arranged to be received beneath the web portion 61 of the sealing element 51 and thereby provides additional support therefor. The insert 58 also has an outer cylindrical wall 62 spaced from the inner cylindrical wall 59 by a radially extending wall 63. The outer cylindrical wall portion 62 and the radially extending wall 63 are proportioned to snugly embrace the exterior of the case 56. The outer wall portion 62 also has a radially inwardly extending lip 64 arranged to snap over the rim 57 of the case 56. The resiliency of the plastic insert 56 permits the cylindrical wall portions 59 and 62 to be spread apart as illustrated in FIGURE 4, so that the lip 64 snaps over the rim 57 in secure engagement preventing the possibility of axial disengagement between the insert 58 and the remainder of the seal assembly.

From the foregoing, it will be understood that the inserts of the present invention can be combined with a single basic seal design, where required, to provide additional support for the sealing element, and to prevent access of dirt and other contaminants. The separation of the seal support from the sealing element itself permits the seal element to remain flexible at lower pressures which is necessary in order to have an effective sealing member. All of these advantages are attained through the use of a relatively inexpensive insert which is readily engageable with the remainder of the seal assembly when necessary.

It should be evident that various modifications can be made to the described embodiments without departing from the scope of the present invention.

I claim as my invention:

1. In a shaft seal assembly including a case having a centrally apertured radially extending base wall and a cylindrical axially extending side wall, and a fluorocarbon resin sealing element having a sealing lip arranged to engage a shaft in sealing relation and an annular flange portion bonded to the inner surface of said base wall in circumscribing relation to the aperture therein, said sealing element having a relatively flexible web portion extending between its sealing lip and its annular flange portion, the improvement which comprises an insert detachably secured to said seal assembly, said insert having a web portion arranged to underlie said web portion of said sealing element and thereby reduce distortion of said web portion under conditions of high fluid pressure, said insert having an annular flange portion arranged to be received in close fitting engagement against the outer surface of said base wall and a lip proportioned to extend in closely spaced relation to the shaft and thereby prevent dirt from approaching the area of said sealing lip.

2. The seal assembly of claim 1 in which said insert is composed of a resinous material having a tensile strength of at least 3000 p.s.i. at a temperature of 180° F.

3. The seal assembly of claim 1 in which said insert has a peripheral groove arranged to receive the aperture defining edge of said base wall.

4. The seal assembly of claim 1 in which said insert has an axially extending cylindrical wall portion arranged to be snugly received about the outer periphery of said cylindrical axially extending side wall of said case.

5. The seal assembly of claim 1 in which said insert is provided with a lip arranged to snap over the rim of said case.

6. In a shaft seal assembly including a case in the form of a cup shaped element having an apertured base arranged to be received in spaced relation about the shaft, and a fluorocarbon resin sealing element having a sealing lip arranged to engage said shaft in sealing relation and an annular flange portion bonded to the inner wall of said base, said sealing element having an integral web portion extending from said sealing lip to to said annular flange portion, the improvement which comprises an insert detachably secured to said seal assembly, said insert having a web portion proportioned to be received within said web portion of said sealing element to thereby provide support thereto under conditions of high fluid pressure, said insert having an annular flange portion proportioned to be received against the outer wall of said base.

7. In a shaft seal assembly including a case in the form of a cup shaped element having an apertured base arranged to be received in spaced relation about the shaft, and a fluorocarbon resin sealing element having a sealing lip arranged to engage said shaft in sealing relation and an annular flange portion bonded to the inner wall of said base, said sealing element having an integral web portion extending from said sealing lip to to said annular flange portion, the improvement which comprises an insert detachably secured to said seal assembly, said insert having a web portion proportioned to be received within said wall portion of said sealing element to thereby provide support thereto under conditions of high fluid pressure, said insert having an annular flange portion proportioned to be received against the outer wall of said base, and said insert having a lip depending from its annular flange portion to extend in closely spaced relation to said shaft and thereby prevent dirt from approaching the area of said sealing lip.

8. The seal assembly of claim 6 in which said insert is composed of a resinous material having a tensile strength of at least 3000 p.s.i. at a temperature of 180° F.

9. The shaft seal assembly of claim 6 in which said insert has a cylindrical wall portion proportioned to be received about the cylindrical wall of said cup shaped element in snug fitting engagement.

10. The shaft seal assembly of claim 6 in which said insert has a lip arranged to snap over the rim of said cup shaped element to thereby tightly embrace said case.

11. An insert for a fluorocarbon resin sealing element housed within a centrally apertured cylindrical cup shaped case comprising a cylindrical body portion arranged to extend through the aperture in said case for supporting a portion of said sealing element, and wall means proportioned to embrace the exterior of the case and cylindrical wall portion of said case in tightly fitting relation, said insert having a lip extending radially inwardly from said wall means serving as a dirt shield for said element when said element is mounted on a shaft.

12. An insert for a fluorocarbon resin sealing element housed within a centrally apertured cylindrical cup shaped case comprising an inner cylindrical wall portion, an outer cylindrical wall portion spaced from said inner portion by a radially extending wall, said inner wall portion being proportioned to be snugly received within said case and said outer wall portion and said radially extending wall being proportioned to snugly embrace the exterior of said case, said outer wall portion having a radially inwardly extending lip arranged to snap over the rim of said case.

References Cited
UNITED STATES PATENTS

| | | |
|---|---|---|
| 2,804,324 | 8/1957 | Stallings _____ 277—153 |
| 2,804,325 | 8/1957 | Riesing _____ 277—153 |
| 2,914,369 | 11/1959 | Hayman _____ 277—177 |
| 3,254,898 | 6/1966 | Herbenar et al. ____ 277—51 X |

SAMUEL ROTHBERG, *Primary Examiner.*